United States Patent
Hayman et al.

(10) Patent No.: US 9,103,305 B2
(45) Date of Patent: Aug. 11, 2015

(54) INTERNAL COMBUSTION ENGINE

(75) Inventors: Alan W. Hayman, Romeo, MI (US); Hatem Zakaria Orban, Auburn Hills, MI (US); James J. Mazzola, III, Dryden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 533 days.

(21) Appl. No.: 13/005,712

(22) Filed: Jan. 13, 2011

(65) Prior Publication Data

US 2011/0174260 A1    Jul. 21, 2011

Related U.S. Application Data

(60) Provisional application No. 61/295,257, filed on Jan. 15, 2010.

(51) Int. Cl.
*F02B 75/00* (2006.01)
*F02B 75/22* (2006.01)
(Continued)

(52) U.S. Cl.
CPC ............ *F02M 35/116* (2013.01); *F01B 3/0038* (2013.01); *F02B 61/02* (2013.01); *F02B 75/16* (2013.01)

(58) Field of Classification Search
CPC .......... F02B 61/02; F02B 75/16; F02B 75/20; F02B 75/22; F02B 25/00; F02B 2075/025; F02B 2700/031; F02B 2075/182; F02B 3/06; F02F 2001/245; F02F 1/4214; F02F 1/38; F02F 3/00; F05C 2201/021; F01B 3/0038
USPC .............................................. 123/193.5, 54.5
See application file for complete search history.

(56) References Cited

U.S. PATENT DOCUMENTS 3,109,416 A    11/1963    Rose et al.
3,791,144 A     2/1974    Lang
(Continued)

FOREIGN PATENT DOCUMENTS

CN    1416502 A    5/2003
CN    1935585 A    3/2007
(Continued)

OTHER PUBLICATIONS

DE Office Action dated Nov. 5, 2012 for DE Patent Application No. 10 2011 008 609.9; 4 pages.
(Continued)

*Primary Examiner* — Lindsay Low
*Assistant Examiner* — Syed O Hasan
(74) *Attorney, Agent, or Firm* — Cantor Colburn LLP

(57) ABSTRACT

A modular engine family comprises an engine block assembly having an upper end extending at an angle a from a rear of the engine block assembly to a front thereof. An engine block closes the upper end and defines a crankcase comprising a crankshaft having three journals supported by journal bearings for rotation therein. First and second piston pins and associated first and second piston/rod assemblies are disposed in piston cylinders of a first cylinder housing assembly wherein the first and second piston pins are located in the same radial position on the crankshaft and are spaced longitudinally to define a firing interval of 360 degrees. A cylinder head is configured to close open ends of the piston cylinders to thereby define combustion chambers with the first and second pistons; the cylinder housing assembly reclined from vertical towards the rear of the engine block by an angle β.

20 Claims, 5 Drawing Sheets

(51) Int. Cl.
*F02B 33/20* (2006.01)
*F02M 35/116* (2006.01)
*F02B 75/16* (2006.01)
*F02B 61/02* (2006.01)
*F01B 3/00* (2006.01)

(56) References Cited

U.S. PATENT DOCUMENTS

| | | |
|---|---|---|
| 4,037,408 A | 7/1977 | Ozawa |
| 4,086,763 A | 5/1978 | Matsushita et al. |
| 4,106,471 A | 8/1978 | Nakajima et al. |
| 4,114,373 A | 9/1978 | Sakai et al. |
| 4,123,902 A | 11/1978 | Iida |
| 4,177,640 A | 12/1979 | Kuroda et al. |
| 4,218,880 A | 8/1980 | Kuroda et al. |
| 4,258,547 A | 3/1981 | Fenn |
| 4,262,639 A | 4/1981 | Motosugi et al. |
| 4,480,600 A | 11/1984 | Gill |
| 4,805,403 A | 2/1989 | Bowman et al. |
| 4,889,083 A | 12/1989 | Honma et al. |
| 5,003,932 A | 4/1991 | Duncan |
| 5,046,578 A | 9/1991 | Nakayama et al. |
| 5,181,491 A | 1/1993 | Izumi et al. |
| 5,339,918 A | 8/1994 | Nakayama et al. |
| 5,492,088 A | 2/1996 | Ohrnberger |
| 5,531,291 A | 7/1996 | Sato et al. |
| 5,613,470 A * | 3/1997 | Shiomi et al. ............. 123/195 P |
| 5,630,386 A | 5/1997 | Uchida |
| 5,660,154 A | 8/1997 | Fields |
| 5,901,677 A | 5/1999 | Ohrnberger et al. |
| 6,095,105 A | 8/2000 | Lohr et al. |
| 6,161,513 A | 12/2000 | Lohr et al. |
| 6,357,401 B1 | 3/2002 | Moriyama et al. |
| 6,510,912 B1 | 1/2003 | Atsuumi |
| 6,745,730 B2 * | 6/2004 | Yamashita ................ 123/54.5 |
| 6,941,914 B2 * | 9/2005 | Snyder et al. ............. 123/90.31 |
| 7,070,526 B2 | 7/2006 | Lawrence |
| 7,131,416 B2 | 11/2006 | Sasaki et al. |
| 7,438,040 B2 * | 10/2008 | Sugita et al. ............. 123/195 R |
| 7,757,655 B2 * | 7/2010 | Inui et al. ................. 123/195 R |
| 7,770,555 B2 | 8/2010 | Matsuda |
| 7,827,955 B2 | 11/2010 | Matsuda et al. |
| 8,256,402 B2 | 9/2012 | Yamagata et al. |
| 2003/0019464 A1 | 1/2003 | Morii et al. |
| 2004/0206567 A1 | 10/2004 | Kato et al. |
| 2005/0006168 A1 | 1/2005 | Iwasaka et al. |
| 2005/0257765 A1 | 11/2005 | Saitoh et al. |
| 2006/0144354 A1 * | 7/2006 | Tanaka et al. ............. 123/48 B |
| 2006/0283418 A1 | 12/2006 | Matsuda et al. |
| 2008/0210189 A1 | 9/2008 | Boyes et al. |
| 2011/0209937 A1 | 9/2011 | Belzile et al. |

FOREIGN PATENT DOCUMENTS

| | | |
|---|---|---|
| DE | 60020493 T2 | 10/2005 |
| DE | 102008020423 A1 | 10/2009 |
| JP | 2000274321 A | 10/2000 |
| WO | 2009096977 A1 | 8/2009 |

OTHER PUBLICATIONS

Chinese Office Action for Application No. 201110052804.2 dated Apr. 9, 2013; 8 pages.

Chinese Office Action for CN Application No. 201110052804.2, dated Jul. 15, 2014, pp. 1-6.

* cited by examiner

INTERNAL COMBUSTION ENGINE

CROSS-REFERENCES TO RELATED APPLICATIONS

This patent application claims priority to U.S. Provisional Patent Application Ser. No. 61/295,257 filed Jan. 15, 2010 which is hereby incorporated herein by reference in its entirety.

FIELD OF THE INVENTION

Exemplary embodiments of the invention relate to modular engine designs and, more specifically, to an inline 2-cylinder engine and related V-configured 3-cylinder engine.

BACKGROUND

Environmental sustainability, increasing global energy demands and the resulting rise in fuel cost and relatively new demand in developing economies for independent but less costly transportation is driving vehicle and powertrain designers towards smaller and more fuel efficient vehicles. It is not uncommon to find inline 3 and 4 cylinder engines powering many medium to small sized vehicles. However, these engines are length constrained by their inline cylinder configurations which operate to define the minimum vehicle architectural space in which they may be packaged. Narrow angle V-configured engines offer some additional packaging advantages by staggering pistons in offset banks, offering additional pistons and resulting power, without unnecessarily increasing the length of the engine package. However, engine height may suffer in such engines due to the use of a single cylinder head having a height beyond that required for an inline engine.

SUMMARY OF THE INVENTION

In an exemplary embodiment, a common family internal combustion engine, comprises an engine block assembly having a lower end closed by an oil pan and an upper end extending at an angle α from a rear of the engine block assembly to a front thereof, an engine block closing the upper end and defining a crankcase that is configured to house a crankshaft for rotation therein. The crankshaft further comprises three crankshaft journals supported by journal bearings for rotation within the crankcase. First and second piston pins and associated first and second piston/rod assemblies are disposed in piston cylinders of a first cylinder housing assembly wherein the first and second piston pins are spaced longitudinally. A cylinder head is configured to close open ends of the piston cylinders to thereby define combustion chambers with the first and second pistons, the cylinder housing assembly reclined from vertical towards the rear of the engine block by an angle β.

The above features and advantages, and other features and advantages of the invention are readily apparent from the following detailed description of the invention when taken in connection with the accompanying drawings.

DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

Figure 1:
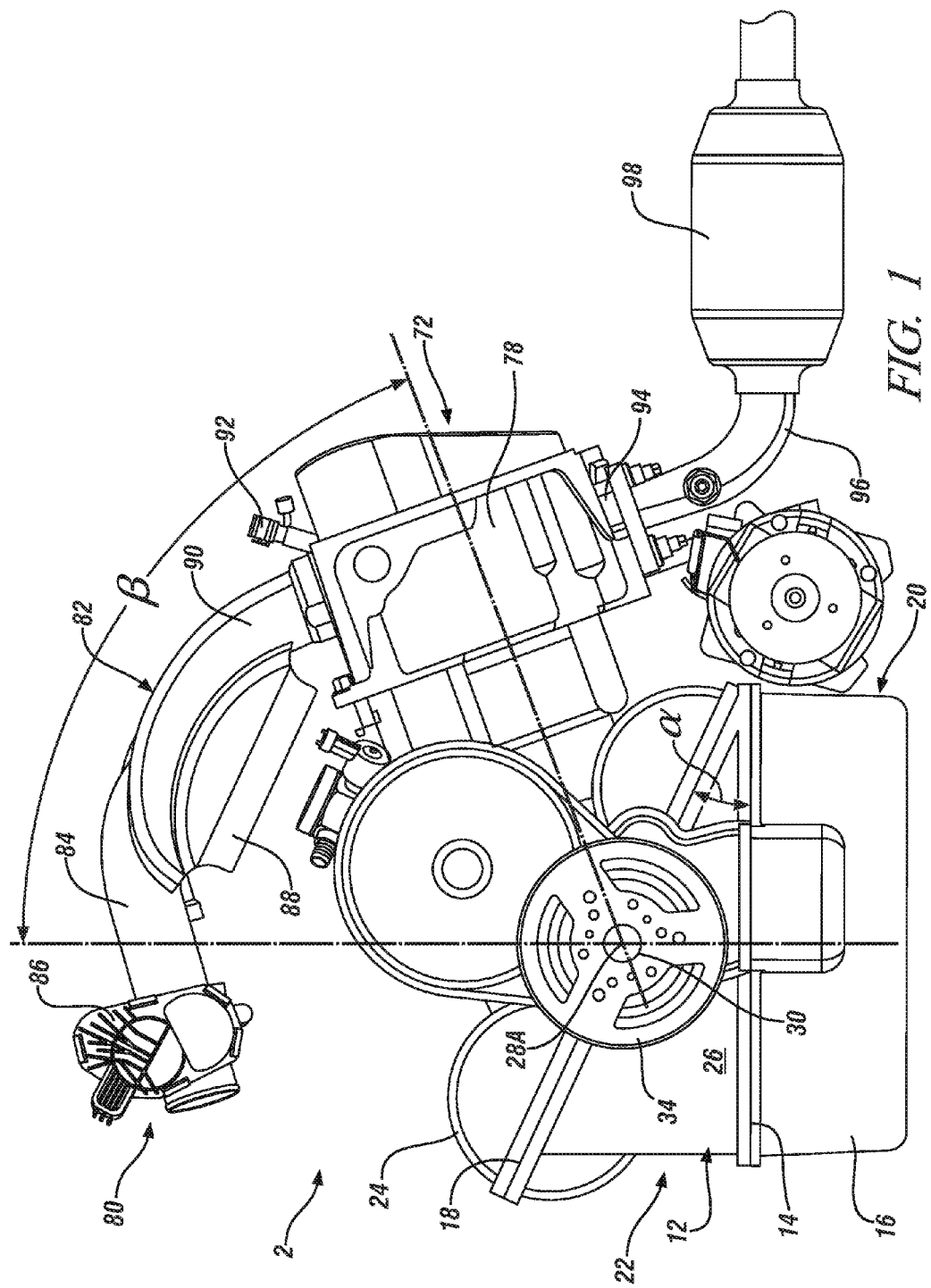
FIG. 1 is a side view of an inline 2-cylinder engine embodying features of the invention.

The following description is merely exemplary in nature and is not intended to limit the present disclosure, its application or uses. It should be understood that throughout the drawings, corresponding reference numerals indicate like or corresponding parts and features.

Figure 2:
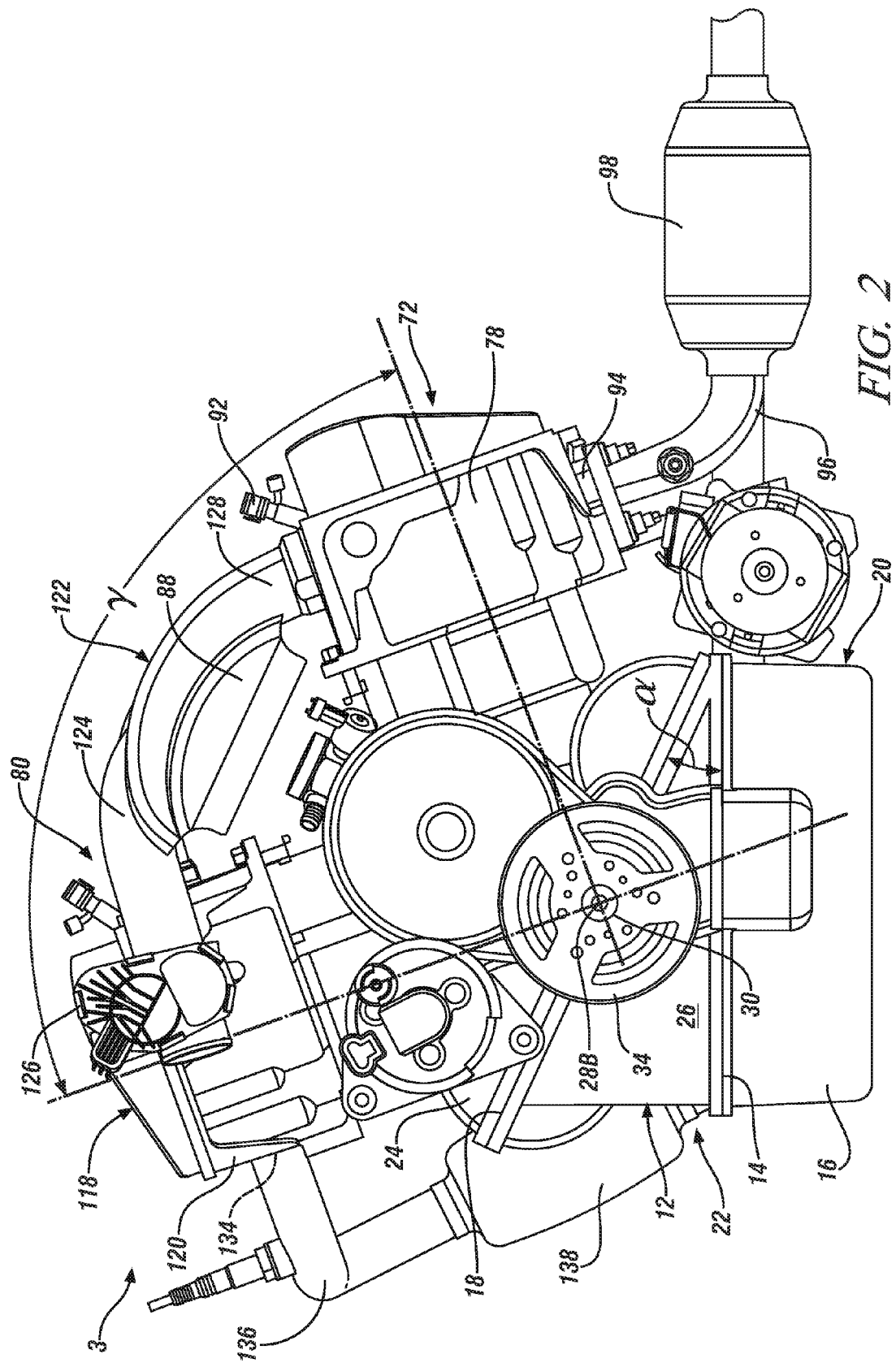
FIG. 2 is side view of a V-configured 3-cylinder engine embodying features of the invention.

Referring to FIGS. 1 and 2, in an exemplary embodiment there is shown a family of internal combustion engines that include an inline configured 2-cylinder engine 2, FIG. 1, and a V-configured 3-cylinder engine 3, FIG. 2. In the various figures, like features that are shared between the inline 2-cylinder engine 2 and the V-configured 3-cylinder engine 3 have like numbers assigned thereto. The engines 2 and 3 include engine block assemblies 12 having an open lower portion or rim 14 that is closed by an oil reservoir or pan 16. The upper ends 18 of the engine block assemblies 12 extend at an angle "α" from the rear 20 of the engines 2, 3 to the front 22 of the engines and are closed by an engine block 24. It is contemplated that the angle a may be in a range of about 45°, but it is also contemplated the angle a may vary in a range of about 0° to about 45° depending upon the particular vehicle configuration and other application driven variables. The combination of the engine block assembly_12, the oil pan 16 and the engine block 24 defines a crankcase 26 that houses and supports crankshafts 28A or 28 B (28A =2- cylinder engine 2 and 28B =3-cylinder engine 3) and balance shafts 27 and 29, FIGS. 3 and 5, for rotation therein. The crankshafts 28A or 28B are coupled by a belt, chain or gear drive to rotatably operate a camshaft 33, FIG. 7.

Figure 3:
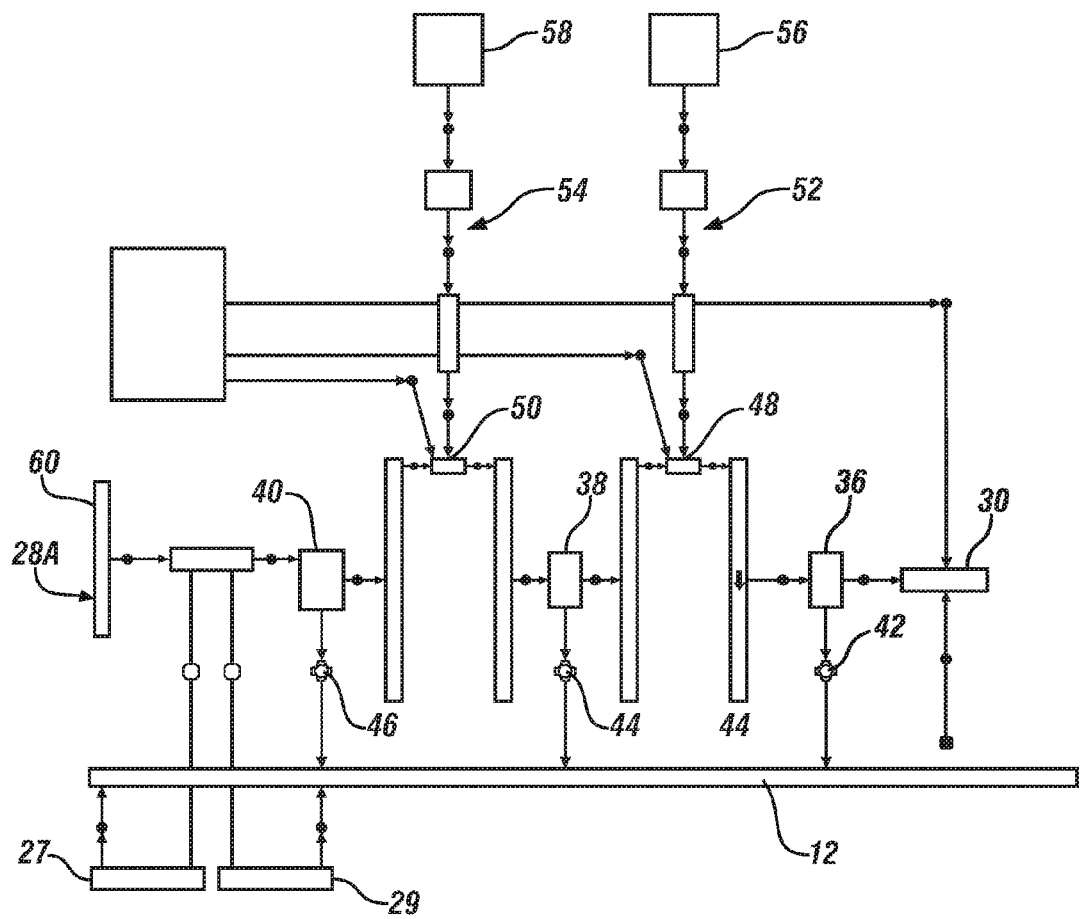
FIG. 3 is a schematic view of the inline 2-cylinder engine of FIG. 1.
Figure 4:
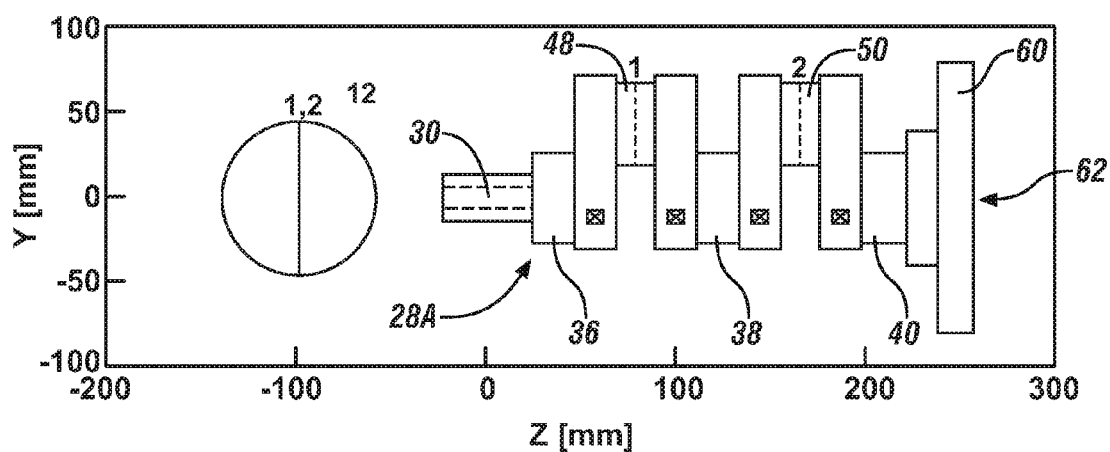
FIG. 4 is a schematic view of a crankshaft of the inline 2-cylinder engine of FIG. 1.

As illustrated in FIGS. 1, 3 and 4, in an exemplary embodiment, the inline configured 2 cylinder engine 2 comprises a crankshaft 28A that includes a crank snout 30 at a first end. The crank snout 30 extends outwardly of the front of the engine block assembly 12 and may support a crankshaft pulley 34 thereon. Three crankshaft journals 36, 38, and 40 are supported by journal bearings 42, 44 and 46 to thereby allow the crankshaft 28A to rotate freely within the crankcase 26. Two piston pins 48 and 50 support associated first and second piston/rod assemblies 52 and 54 in first and second cylinders 56 and 58, respectively. As the crankshaft 28A rotates, the piston/rod assemblies 52, 54 reciprocate within the cylinders 56, 58 in a known manner. In the exemplary embodiment shown in FIGS. 3 and 4, the piston pins 48 and 50 are located in radially the same location in a longitudinally spaced relationship along the crankshaft 28A to allow for a firing interval of 360 degrees (4-stroke engine). Flywheel 60 is disposed at a second end 62 of the crankshaft 28A and may be configured to engage an associated transmission assembly (not shown) as well as other related engine assemblies as may be required (ex. a starter motor, for instance). Gear driven balance shafts 27 and 29 may be located for rotation within the crankcase 26 and operate to reduce vibration caused by natural imbalances in the 2 cylinder inline design. Referring again to FIG. 1, in an exemplary embodiment the engine cylinders 56 and 58 are disposed within a first cylinder housing assembly 72 of engine block 24 for reciprocation therein. Closing the upper end of the first cylinder housing assembly 72 is a first cylinder head 78 that closes the open ends of the first and second piston cylinders 56 and 58, FIG. 3, and defines combustion chambers (not shown) with the first and second piston/rod assemblies 52, and 54.

In an exemplary embodiment, an intake assembly 80 is configured to conduct combustion air to intake ports (not shown) of the cylinders 56 and 58 for mixture and combustion with injected fuel (not shown). The intake assembly 80 comprises an intake manifold 82 having an inlet runner 84 for receiving metered combustion air through a throttle body 86. The inlet runner 84 fluidly connects with, and delivers combustion air to, a central plenum 88 of the intake manifold 82 where the combustion air is distributed to intake runners 90 that are fluidly connected to the combustion chambers of each cylinder 56 and 58. The combustion air enters each cylinder, is mixed with fuel injected from fuel injectors 92 connected to a fuel system (not shown) and is combusted therein.

In an exemplary embodiment, an exhaust manifold 94 is also fluidly connected with the cylinder head 78 and is configured to remove combustion by-products from the combustion chambers. The combustion by-products flow through an exhaust system conduit 96 that is configured to receive the combustion by-products from the exhaust manifold 94 and to transfer the combustion by-products to various exhaust gas after treatment devices, such as the close-coupled catalytic converter 98, for oxidation, reduction or other conversion of regulated exhaust gas constituents of the combustion by-products prior to their release to the atmosphere.

Referring to FIGS. 2 and 5-7, in an exemplary embodiment the V-configured 3-cylinder engine 3 includes the engine block assembly 12 having an open lower portion or rim 14 that is closed by an oil reservoir or oil pan 16. The upper end 18 of the engine block assembly 12 extends at an angle "a" from the rear of the engine 20 to the front of the engine 22 and is closed by an engine block 24. It is contemplated that the angle α may be in a range of about 45°, but it is also contemplated the angle α may vary in a range of about 0° to about 45° depending upon the particular vehicle configuration and other application driven variables. The combination of the engine block assembly 12, the oil pan 16 and the engine block 24 define a crankcase 26 that houses and supports a crankshaft 28B, FIGS. 5 and 6 A balance shaft 27 may be located within the crankcase 26 for rotation therein. The crankshaft 28B is coupled by a belt, chain or gear drive to rotatably operate a camshaft 33. The camshaft acts upon pushrods 32 that extend into cylinder heads 78 and 120 for operation of valve gear (not shown) disposed therein.

Figure 5:
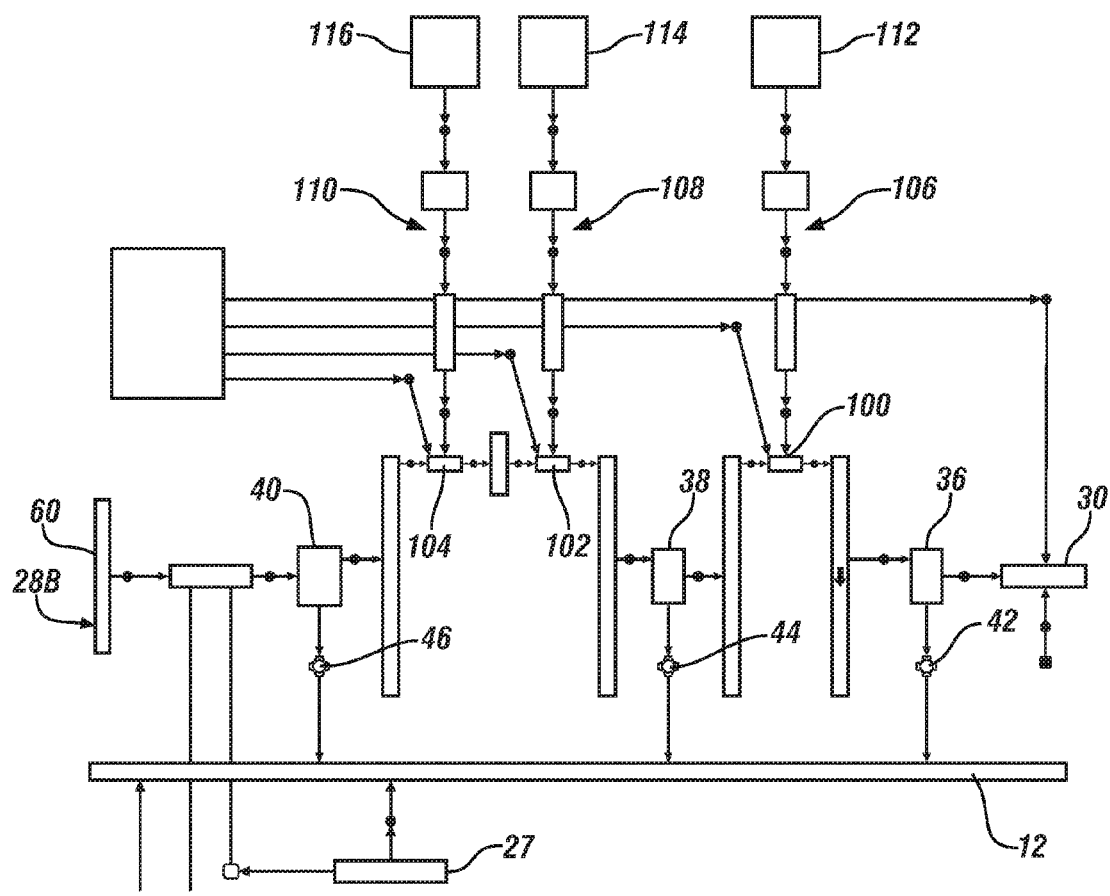
FIG. 5 is a schematic view of the V-configured 3-cylinder engine of FIG. 2.
Figure 6:
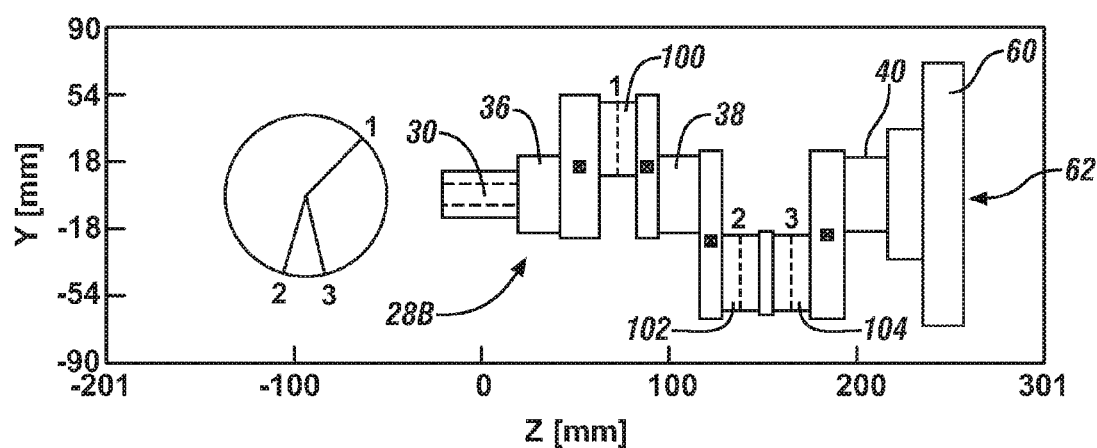
FIG. 6 is a schematic view of a crankshaft of the V-configured 3-cylinder engine of FIG. 2.

As illustrated in FIG. 6, in an exemplary embodiment, the crankshaft 28B comprises a crank snout 30 at a first end. The crank snout 30 extends outwardly of the front of the engine block assembly 12 and supports a crankshaft pulley 34, FIG. 2, thereon. Three crankshaft journals 36, 38, and 40 are supported by journal bearings 42, 44 and 46 to thereby allow the crankshaft 28B to rotate freely within the crankcase 26. Three piston pins 100, 102 and 104 support associated piston/rod assemblies 106, 108 and 110 in cylinders 112, 114 and 116. In the exemplary embodiment shown, piston pins 102 and 104 are disposed closely adjacent to one another and between crankshaft journals 38 and 40. This configuration differs from most inline 3-cylinder engines which typically require four crankshaft journals that add to the length of the engine package, add friction and increase oil delivery requirements. As the crankshaft 28B rotates, the pistons reciprocate within the cylinders in a known manner. In the embodiment shown in FIGS. 5 and 6, the first and second piston pins 102, 104 for piston/rod assemblies 114 and 116 may be located in radially the same location in a longitudinally spaced relationship along the crankshaft 28B. The third piston pin 100 may be located at about 180 degrees radially from the first and second piston pins 102 and 104 allowing for an overall firing interval of 240 degrees (4-stroke engine). Other radial spacings are, of course, contemplated while not deviating from the scope of the invention. Flywheel 60 is disposed at a second end 62 of the crankshaft 28B and may be configured to engage an associated transmission assembly (not shown) as well as other related engine assemblies as may be required (ex. a starter motor, for instance). A gear driven balance shaft 27 may be disposed for rotation within the crankcase 26 and operates to reduce vibration caused by natural imbalances in the 3-cylinder V-configured design.

Referring again to the FIGS. 2, 5 and 6, in an exemplary embodiment the engine cylinders 112 and 116 are disposed within a first cylinder housing assembly 72 for reciprocation therein. The third engine cylinder 114 is disposed within a cylinder housing assembly 118 of engine block 24 for reciprocation therein. Due to the adjacent location of the piston pins 102 and 104 the third cylinder 114 and the cylinder housing assembly 118 may not be centered with respect to the first and second cylinders 112 and 116 but may be axially offset in the direction of piston pin 104. The configuration of the V-configured 3-cylinder engine 3 allows for the same or a similar crank set to be used in both the 2 and 3-cylinder engines 2 and 3, with only a change in the crankshaft configuration; particularly the addition of a third, radially spaced piston pin 100 since the crankshaft journals 36, 38 and 40 and associated journal bearings 42, 44 and 46 are of the same geometry and are similarly located for installation in both the inline configured 2-cylinder engine 2, and the V-configured 3-cylinder engine 3. Closing the upper end of the first cylinder housing assembly 72 is a first cylinder head 78 that closes the open ends of the piston cylinders 112 and 116 and defines combustion chambers (not shown) with the pistons 106, 110. Similarly, closing the upper end of the second cylinder housing assembly 118 is a second cylinder head 120 that closes the open end of the third piston cylinder 114 and defines a combustion chamber (not shown) with the third piston 108.

In an exemplary embodiment, a low profile intake assembly 80 is configured to conduct combustion air to intake ports (not shown) of the cylinders 112, 114 and 116 for mixture and combustion with injected fuel (not shown). The intake assembly 80 comprises an intake manifold 122 having an inlet runner 124 for receiving metered combustion air through a throttle body 126. The inlet runner 124 fluidly connects with and delivers combustion air to a central plenum 88 of the intake manifold 122 where the combustion air is distributed to intake runners 128, 130, 132, FIG. 7, that are fluidly connected to the combustion chambers of each cylinder 112, 114 and 116. The combustion air enters each cylinder, is mixed with fuel injected from fuel injectors 92 connected to a fuel system (not shown) and is combusted therein. A second exhaust manifold 134 is also fluidly connected with the cylinder head 120 and is configured to remove combustion by-products from the combustion chamber of the third cylinder 114. The combustion by-products flow through an exhaust system conduit 136 that is configured to receive the combustion by-products from the second exhaust manifold 134 and to conduct the exhaust gas through the exhaust system conduit 136 where it is delivered to various exhaust gas after treatment devices, such as the close-coupled catalytic converter 138, for oxidation, reduction or other conversion of regulated exhaust gas constituents of the combustion by-products prior to their release to the atmosphere.

In an exemplary embodiment, and referring to the inline configured 2 cylinder engine 2, FIG. 1, the angling of the upper end 18 of engine block assembly 12 facilitates the angling or laying back of the first cylinder housing assembly 72 for the purposes of packaging the engine 2 in an efficient manner in a vehicle. In the embodiment illustrated in FIG. 1, the rearward bank angle β of the first cylinder housing assembly 72 is about 70° from vertical. It is however contemplated that the rearward bank angle β may vary from about 30° to about 90° depending upon the particular vehicle configuration and other application driven variables. With such a configuration, the 2-cylinder engine 2 is packageable in virtually any vehicle platform or configuration.

Figure 7:
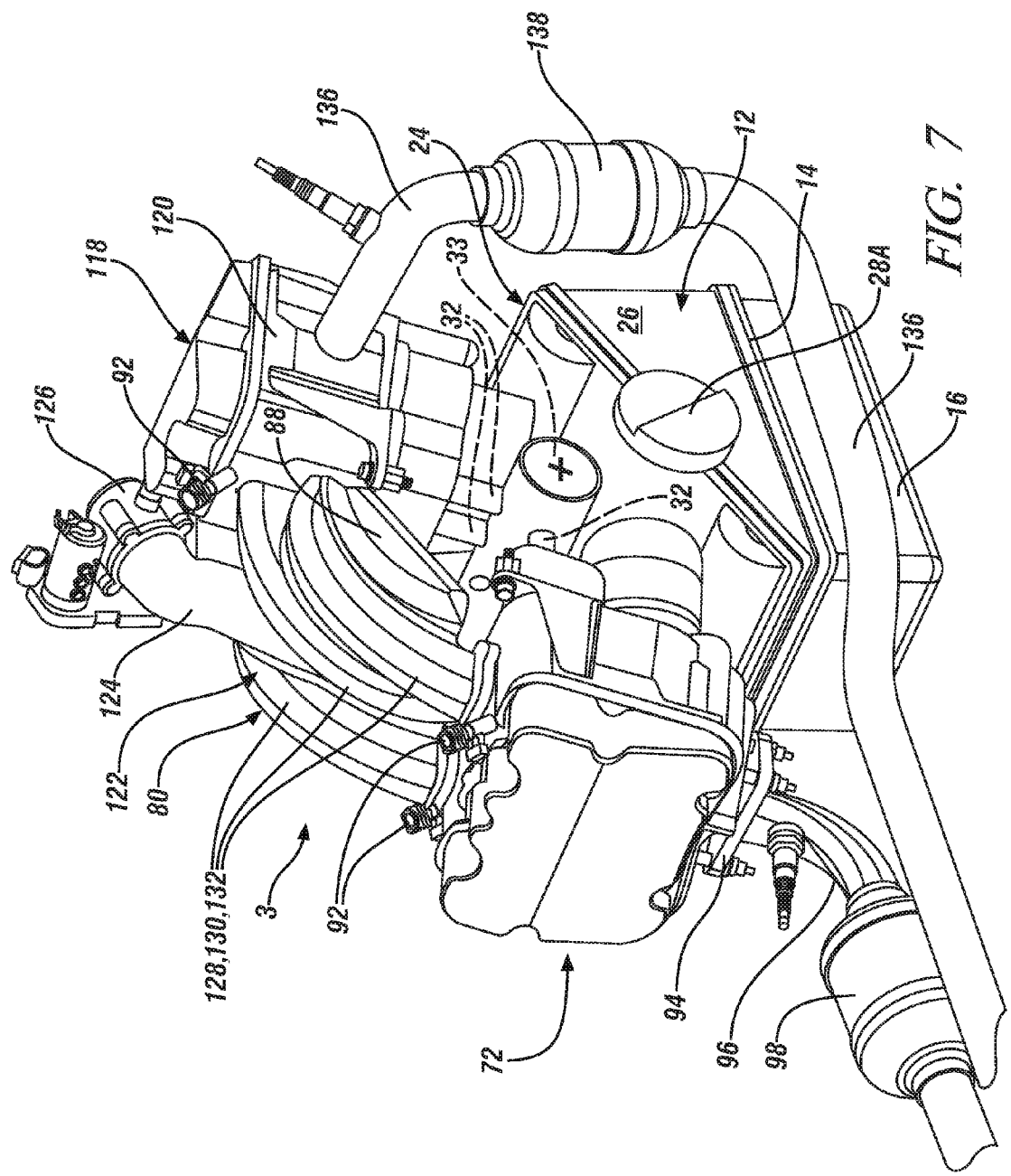
FIG. 7 is a rear perspective view of the V-configured 3-cylinder engine of FIG. 2.

In another exemplary embodiment, and referring to the V-configured 3 cylinder engine 3, FIGS. 2 and 5, the engine cylinder 114 of the second cylinder housing assembly 118 is preferably oriented at an angle "γ" that is about 90 degrees from the two inline cylinders 112, 116 of the first cylinder housing assembly 72, respectively. It is however contemplated that the angle "γ" may vary from about 25° to about 115°, again depending upon the particular vehicle configuration and other application driven variables. Such an orientation, as is illustrated in FIGS. 2 and 7 will allow the V-configured 3-cylinder engine 3 to maintain the low profile achieved by the inline 2-cylinder engine 2 while providing extra power that may be required for certain applications. The single, relatively upright oriented single engine cylinder 114 of the second cylinder housing assembly 118 is small and relatively centrally located so as to partially package in a portion of a vehicle tunnel resulting in the same vehicle packaging and interior space benefits that are realized with the inline 2-cylinder engine 2 described above.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A common family internal combustion engine, comprising:
    an engine block assembly having a substantially horizontally disposed lower end defining a lower end interface closed by an oil pan and an angled upper end defining an angled upper end interface extending at an angle α relative to the lower end interface from a rear of the engine block assembly to a front thereof, the angled upper end interface and the lower end interface intersecting at said rear of the engine block assembly;
    an engine block mated to the engine block assembly at the angled upper end interface and thereby closing the angled upper end of the engine block assembly such that the engine block assembly and the oil pan and the engine block together define a crankcase that is configured to house a crankshaft for rotation about a crankshaft axis, the crankshaft further comprising three crankshaft journals supported by journal bearings for rotation about the crankshaft axis, the crankshaft axis being disposed at the angled upper end of the engine block assembly;
    first and second piston pins and associated first and second piston/rod assemblies disposed in piston cylinders of a first cylinder housing assembly; and
    a cylinder head configured to close open ends of the piston cylinders to thereby define combustion chambers with the first and second piston/rod assemblies, the first cylinder housing assembly reclined from vertical, towards the rear of the engine block, about the crankshaft axis by an angle β relative to vertical.

2. The common family internal combustion engine of claim 1, wherein the first and second piston pins are located in the same radial position on the crankshaft and are spaced longitudinally to define a firing interval of 360 degrees.

3. The common family internal combustion engine of claim 1, wherein the angle α is within the range of about 0 degrees to about 45 degrees.

4. The common family internal combustion engine of claim 3, wherein the angle α is within the range of about 45 degrees.

5. The common family internal combustion engine of claim 1, wherein the angle α is within the range of about 30 degrees to about 90 degrees.

6. The common family internal combustion engine of claim 5, wherein the angle β is at least as great as the angle α.

7. The common family internal combustion engine of claim 1, the crankshaft further comprising:
    a third piston pin and associated piston/rod assembly disposed in a piston cylinder of a second cylinder housing assembly wherein the third piston pin is disposed adjacent to one of the first or second piston pins and between two crankshaft journals; and
    a second cylinder head configured to close an open end of the third piston cylinder to thereby define a combustion chamber with the third piston/rod assembly, the second cylinder housing assembly oriented an angle γ, about the crankshaft axis, from the first cylinder housing assembly.

8. The common family internal combustion engine of claim 7, wherein the three crankshaft journals and associated journal bearings are of the same geometry and are similarly located for installation in both the inline configured 2-cylinder engine and the V-configured 3-cylinder engine.

9. The common family internal combustion engine of claim 7, wherein the third piston pin is located about 180 degrees radially from first and second piston pins to define a firing interval of 240 degrees.

10. The common family internal combustion engine of claim 7, wherein the third piston cylinder is not axially centered with respect to the first and second cylinders.

11. The common family internal combustion engine of claim 7, wherein the angle γ is within the range of about 25 degrees to about 115 degrees.

12. The common family internal combustion engine of claim 11, wherein the angle γ is within the range of about 90 degrees.

13. An internal combustion engine family having an inline 2-cylinder engine and a V-configured 3-cylinder engine, the inline 2-cylinder engine comprising:
    an engine block assembly having a substantially horizontally disposed lower end defining a lower end interface closed by an oil pan and an angled upper end defining an angled upper end interface extending at an angle α relative to the lower end interface from a rear of the engine block assembly to a front thereof, the angled upper end interface and the lower end interface intersecting at said rear of the engine block assembly;

an engine block mated to the engine block assembly at the angled upper end interface and thereby closing the angled upper end of the engine block assembly;

such that the engine block assembly and the oil pan and the engine block together define a crankcase that is configured to house a crankshaft for rotation about a crankshaft axis, the crankshaft further comprising:

three crankshaft journals supported by journal bearings for rotation about the crankshaft axis, the crankshaft axis being disposed at the angled upper end of the engine block assembly;

first and second piston pins associated with first and second piston/rod assemblies for disposition in piston cylinders of a first cylinder housing assembly wherein the first and second piston pins are spaced longitudinally;

a cylinder head configured to close open ends of the piston cylinders of the first cylinder housing assembly to thereby define combustion chambers with the first and second piston/rod assemblies, the first cylinder housing assembly reclined from vertical, towards the rear of the engine block, about the crankshaft axis by an angle β relative to vertical; and the V-configured 3-cylinder engine comprising:

a third piston pin and associated piston/rod assembly disposed in a piston cylinder of a second cylinder housing assembly wherein the third piston pin is disposed adjacent to one of the first or second piston pins and between two crankshaft journals; and a second cylinder head configured to close an open end of the third piston cylinder of the second cylinder housing assembly to thereby define a combustion chamber with the third piston/rod assembly, the second cylinder housing assembly oriented at an angle γ, about the crankshaft axis relative to the first cylinder housing assembly.

14. The internal combustion engine family of claim 13, wherein the three crankshaft journals and associated journal bearings are of the same geometry and are similarly located for installation in both the inline configured 2-cylinder engine and the V-configured 3-cylinder engine.

15. The internal combustion engine family of claim 13, wherein the angle α is within the range of about 0 degrees to about 45 degrees.

16. The internal combustion engine family of claim 15, wherein the angle α is within the range of about 45 degrees.

17. The internal combustion engine family of claim 13, wherein the angle β is within the range of about 30 degrees to about 90 degrees.

18. The internal combustion engine family of claim 17, wherein the angle β is at least as great as the angle α.

19. The internal combustion engine family of claim 13, wherein the angle γ is within the range of about 30 degrees to about 90 degrees.

20. The internal combustion engine family of claim 19, wherein the angle γ is within the range of about 90 degrees.

* * * * *